UNITED STATES PATENT OFFICE.

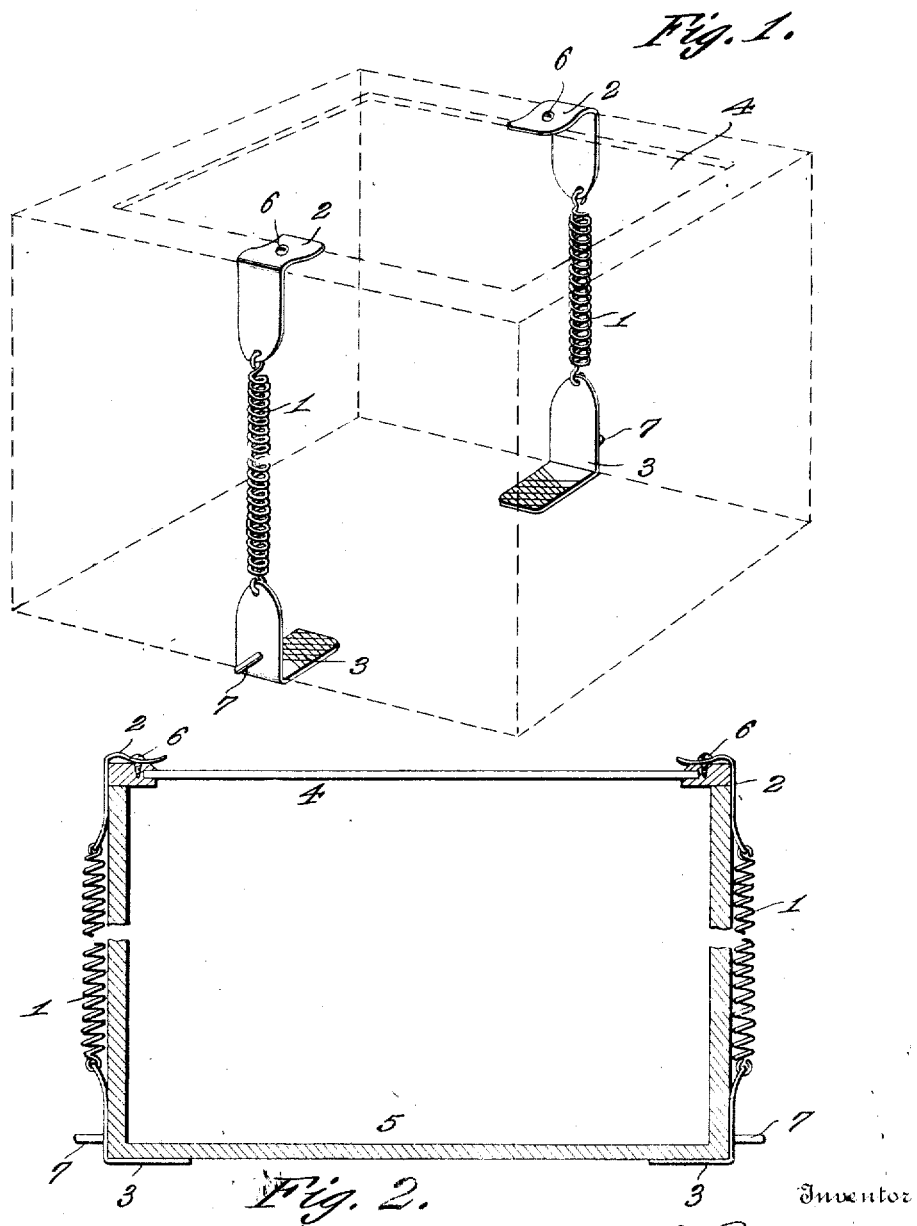

HENRY BURCH, OF LA GRANGE, TENNESSEE.

CLAMP FOR BOXES.

949,619.　　　　　Specification of Letters Patent.　　Patented Feb. 15, 1910.

Application filed June 21, 1909. Serial No. 503,426.

*To all whom it may concern:*

Be it known that I, HENRY BURCH, a citizen of the United States, residing at La Grange, in the county of Fayette and State of Tennessee, have invented certain new and useful Improvements in Clamps for Boxes, of which the following is a specification.

This invention consists of a peculiar form of temporary clamp, designed particularly for use on pastry or cracker boxes used by grocers, and in stores generally. It is customary to supply to such boxes a temporary top for display purposes and consisting of a frame and glass pane therein.

The present invention is designed to facilitate the attachment of this display top to the body of the receptacle.

For a full understanding of the invention, reference is to be had to the following detail description and to the accompanying drawings, in which—

Figure 1 is a perspective view showing the clamps in the general arrangement thereof when applied to a box, the box being shown in dotted lines as well as the display top; Fig. 2 is a sectional view bringing out the parts shown in Fig. 1 more clearly.

Throughout the following detail description and on the several figures of the drawings similar parts are referred to by like reference characters.

Specifically describing the invention, which is of extremely simple construction, and referring to the drawings, the numeral 1 designates a coiled spring, the opposite ends of which are connected with an upper clamping hook 2 and a lower clamping hook 3. The hook 2 is adapted to engage over a side of the frame of the display top 4, while the hook 3 engages beneath the box or receptacle 5. If desired, the upper portion of the hook 2 may be provided with an aperture and a screw fastening 6 employed to secure this hook permanently to the display top 4.

The hook 3 is somewhat larger than the hook 2 and on its outer side is provided a finger piece 7 which may be readily grasped in order to facilitate disengagement of the clamp from the box, and should it be desired to remove the display top 4.

The clamp may be readily operated in order to apply the display top of the box 5, or remove the same, the spring 1 being relied upon to give sufficient tension to very firmly hold the display top in place.

Having thus described the invention, what is claimed as new is:

1. In combination with a box, a removable top applied thereto, a clamp device for securing said top to the box, each of said devices comprising upper and lower clamping hooks, the upper clamping hook being secured permanently to the removable top and the lower clamping hook engaging beneath the bottom of the box, a spring connecting the two clamping hooks together, and a finger piece projected outwardly from the outermost portion of the lower hook.

2. As an article of manufacture, a clamp consisting of a coiled spring, upper and lower hooks connected with the spring at its opposite ends, the lower hook being larger than the upper hook and being provided on its outer side with an outwardly projecting finger piece.

In testimony whereof I affix my signature in presence of two witnesses.

HENRY BURCH.

Witnesses:
W. C. PERROW,
H. W. L. HIGG---